(12) United States Patent
Nabeiro

(10) Patent No.: US 11,103,101 B2
(45) Date of Patent: Aug. 31, 2021

(54) SYSTEM FOR PREPARING AROMATIC BEVERAGES WITH OPTMIZED BEVERAGE DISCHARGE DISPOSITION AND PROCESS OF OPERATION OF SAID SYSTEM

(71) Applicant: NOVADELTA—COMÉRCIO E INDÚSTRIA DE CAFÉS S.A., Lisbon (PT)

(72) Inventor: Rui Miguel Nabeiro, Campo Maior (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 285 days.

(21) Appl. No.: 16/301,857

(22) PCT Filed: May 16, 2017

(86) PCT No.: PCT/PT2017/050013
§ 371 (c)(1),
(2) Date: Nov. 15, 2018

(87) PCT Pub. No.: WO2017/200409
PCT Pub. Date: Nov. 23, 2017

(65) Prior Publication Data
US 2019/0282023 A1     Sep. 19, 2019

(30) Foreign Application Priority Data
May 16, 2016   (PT) .......................................... 109389

(51) Int. Cl.
*A47J 31/24*    (2006.01)
*A47J 31/44*    (2006.01)
(Continued)

(52) U.S. Cl.
CPC ............ *A47J 31/46* (2013.01); *A47J 31/24* (2013.01); *A47J 31/44* (2013.01); *A47J 31/4492* (2013.01);
(Continued)

(58) Field of Classification Search
CPC ...... A47J 31/46; A47J 31/407; A47J 31/3676; A47J 31/3623; A47J 31/369; A47J 31/368;
(Continued)

(56) References Cited

U.S. PATENT DOCUMENTS

| 4,767,632 A | * | 8/1988 | Meier | ............... | A47J 31/3609 |
| | | | | | 426/231 |
| 2015/0320256 A1 | | 11/2015 | Kollep | | |
| 2017/0035242 A1 | * | 2/2017 | Kollep | ................. | A47J 31/368 |

FOREIGN PATENT DOCUMENTS

| CN | 103505045 | * | 1/2014 |
| DE | 10 2009 048 233 A1 | | 4/2010 |
| WO | 2015/173128 A1 | | 11/2015 |

OTHER PUBLICATIONS

English Translation for CN103505045 published Jan. 2014.*
(Continued)

*Primary Examiner* — Anthony J Weier
(74) *Attorney, Agent, or Firm* — Sughrue Mion, PLLC

(57) ABSTRACT

A system (1) for preparing beverages, in particular aromatic beverages such as espresso coffee and similar, having at least one type of brewing device (2), at least one beverage discharge disposition (3) that provides beverage discharge in a direction opposite that of the gravity force, and at least one type of beverage recipient (4), for example of the type glass, cup or similar. The system (1) presents at least one introduction opening (8) configured for the introduction of portions (7) of edible substance, arranged next to said beverage discharge disposition (3), so that both are accessible on a
(Continued)

common exterior surface of the apparatus casing (6) of said beverage preparation apparatus (5). Also, a process for preparing beverages having a step of confirmation the correct placement of a beverage recipient (4) engaged in said beverage discharge disposition (3) and display of corresponding information.

15 Claims, 5 Drawing Sheets

(51) Int. Cl.
  *B67D 1/04* (2006.01)
  *A47J 31/46* (2006.01)
  *A47G 19/22* (2006.01)
(52) U.S. Cl.
  CPC .............. *A47J 31/461* (2018.08); *B67D 1/04* (2013.01); *A47G 19/2205* (2013.01)

(58) Field of Classification Search
  CPC ...... A47J 31/4425; A47J 31/461; A47J 31/24; A47J 31/44; A47J 31/4492; A47J 43/046; A47J 2043/04454; B67D 1/04; A47G 19/2205
  See application file for complete search history.

(56) References Cited

OTHER PUBLICATIONS

English Translation for DE102009048233 published Apr. 2010.*
International Search Report for PCT/PT2017/050013 dated Sep. 7, 2017 [PCT/ISA/210].
Written Opinion for PCT/PT2017/050013 dated Sep. 7, 2017 [PCT/ISA/237].

* cited by examiner

SYSTEM FOR PREPARING AROMATIC BEVERAGES WITH OPTMIZED BEVERAGE DISCHARGE DISPOSITION AND PROCESS OF OPERATION OF SAID SYSTEM

CROSS REFERENCE TO RELATED APPLICATIONS

This Application is a National Stage of International Application No. PCT/PT2017/050013 filed May 16, 2017, claiming priority based on Portugal Patent Application No. 109389 filed May 16, 2016.

FIELD OF THE INVENTION

The present invention refers to the field of systems for preparing aromatic beverages by means of extraction of a respective substance, in particular systems with beverage discharge means to the interior of a beverage recipient along a direction that is opposite to the direction of the gravity force.

The present invention further refers to a process of operation of a system for preparing beverages that includes a step of discharge of beverage in a direction opposite the gravity force.

BACKGROUND OF THE INVENTION

The prior art presents several solutions of beverage discharge in machines for preparing beverages. In particular in the case of aromatic beverages such as for example espresso-like coffee, such beverage discharge is a relevant process with potential impact upon the quality of beverage obtained in the recipient. In fact, in particular in the case of espresso-like coffee, the main characteristics of the discharge flow determines several aspects such as the production of crème and retention thereof inside of the cup, and the variation of temperature as a result of the exposition to air during the discharge into the cup.

The document EP 1991094 B1 discloses a beverage recipient adapted so that can be filled from the base and presenting a sealable base-wall for such purpose, whereby the beverage is injected with a pressure sufficient for opening a valve provided as regulation element for the discharge flow.

The document DE 2009 048233 A1 discloses a similar system whereby portions of edible substance are provided to a collection space by means of raising a lever-like disposition that comprises the beverage discharge means. This solution presents constructive complexity and ergonomic constrains.

The documents EP 2120652 B1 and CH 702947 A2 disclose systems for preparing beverages, including espresso-type coffee, with beverage discharge in a direction opposite to the gravity force and through the support base of the recipient. The document WO 2014/086915 A1 seems to disclose a solution that is similar to those of the aforementioned documents.

The document WO 2014/086915 A1 discloses a similar system whereby there appears to be an opening for introducing a portion of edible substance and beverage discharge provided at a similar height. However, the document does not disclose a compact and ergonomic disposition of said elements.

The documents DE 10 2009 048233 A1 and WO 2015/173127 A2 disclose systems for preparing beverages whereby the flow runs through in a direction opposite to the gravity force inside of a brewing device that collects the edible substance that is the beverage precursor.

The document WO 2015/173128 A1 discloses a similar system for preparing beverages, whereby the beverage discharge means comprise a safety valve actuated by the presence or proximity of a recipient equipped with means for activating said valve, whereby is adapted for selectively opening a fluid communication between the brewing unit and the beverage discharge. This solution leads to increased costs of the beverage recipients. Moreover, this solution does not provide information on a correct placement of the beverage recipient, in particular of a correct alignment and engagement with the beverage discharge means, so that the recipient is not displaced when impinged by the discharge flow. Moreover, the option for restricting the fluid connection at the exit of the brewing unit may lead to a situation whereby the already prepared beverage is retained inside thereof, thereby loosing properties during such period, until a beverage recipient is placed in position.

The document WO 2013/041580 A1 discloses a disposition for support of beverage recipients that is provided so that can support recipients of different dimensions, and including means for removable fixation of said recipients.

None of the prior art documents discloses a solution that provides a system with beverage discharge in a direction opposite the gravity force, and that provides a simples and more compact construction of the machine or apparatus for preparing beverages, as well as simpler and more ergonomic means for confirming the placement of a recipient and the display of information on the operation readiness. There is therefore the need for providing a more efficient and ergonomic system.

General Description of the Invention

The objective of the present invention is to provide a system for preparing beverages including at least one brewing device, in particular of aromatic beverages such as for example espresso-type coffee, adapted for collecting a portion of edible substance, optionally provided inside of a capsule, and a beverage discharge disposition adapted so that provides a simpler, more compact and ergonomic construction.

This objective is attained according to the present invention by means of a system for preparing beverages according to claim 1.

In particular, the aforementioned objective is solved by means of a system comprising an apparatus that presents an opening for introduction of portions of edible substance and a beverage discharge disposition on the same exterior surface, preferentially on an exterior surface of the top part of said apparatus.

It is preferred when said opening of introduction and beverage discharge disposition are provided close, preferentially on a region of the exterior surface presenting an area smaller than three times, preferentially smaller than two times, the sum of the areas individually occupied by said opening of introduction and beverage discharge disposition.

It is preferred when a utilization interface of said apparatus is also provided on the same exterior surface, so that all the manual actions associated with the use of said apparatus, including the placing of a portion, the actuation of the utilization interface and the placement and collection of a beverage recipient, at a similar level and in relative proximity.

It is preferred when said system comprises at least one, preferentially a plurality of types of beverage recipients, including at least one of different dimension and different shape, in particular presenting a general shape of glass, cup or similar type.

A related objective is that of, considering the uncommon arrangement of the beverage discharge disposition, providing simple and ergonomic means for confirming the placement of the recipient and the display of information on the state of readiness for operating said system, so that the user can use it in safe conditions.

In particular, this objective is solved by means of information display means associated with the beverage discharge disposition and provided in functional connection with at least one of a sensor of retention of beverage recipient and a control device of said apparatus for preparing beverages.

Another objective of the present invention is to provide a process for preparing beverages that provides better conditions of beverage discharge flow into a respective beverage recipient.

This objective is solved according to claim 13.

It is preferred when the step of placement of a beverage recipient on said beverage discharge disposition does not include the actuation of said flux regulation device, preferentially a unidirectional valve, provided in the base zone of said beverage recipient.

It is preferred when the step of beverage discharge includes a beverage discharge flow with a flow pressure bigger than 1.1 bar, preferentially a flow pressure bigger than the pressure necessary for displacing upwards an elastic element of said flux regulation device, so as to release at least one passageway of discharge flow to the interior of said beverage recipient.

DESCRIPTION OF THE FIGURES

The invention shall now be explained in greater detail based upon preferred embodiments and the attached Figures.

The Figures show, in simplified schematic representations.

DETAILED DESCRIPTION OF THE INVENTION

Figure 1:
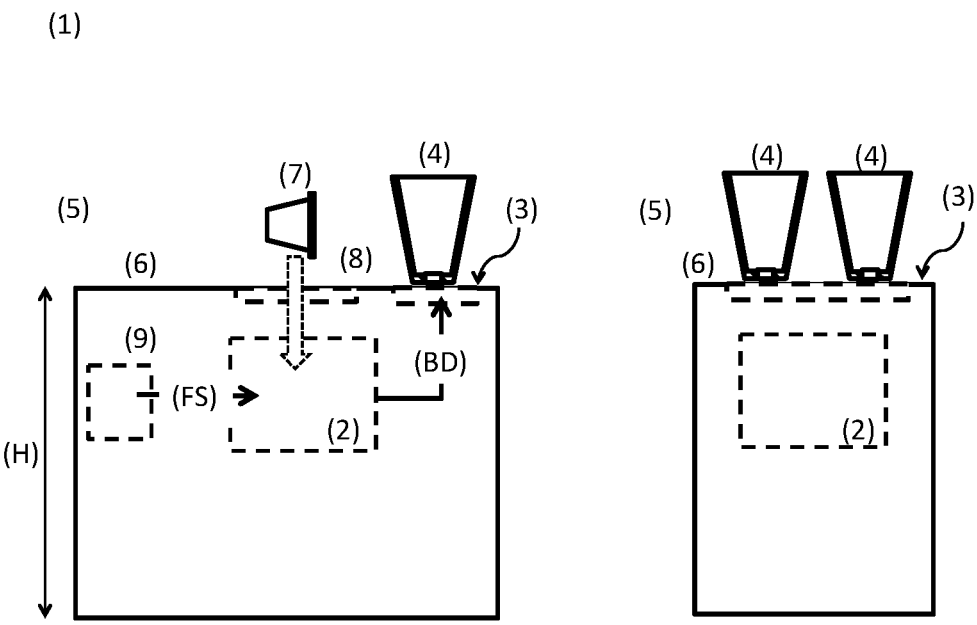
FIG. 1: side (on the left-side) and front views of a first embodiment of an apparatus (5) for preparing beverages comprised on a system (1) according to the invention.

FIG. 1 represents side views (on the left-side of the drawing) and front views of a first embodiment of an apparatus (5) for preparing beverages includes in a system (1) according to the present invention.

As represented, said apparatus (5) presents a brewing device (2), in this case provided inside of the apparatus casing (6) of said apparatus (5), whereby said brewing device (2) is provided so that can collect a portion of beverage precursor edible substance contained inside of a capsule (7). The apparatus casing (6) of said apparatus (5) presents an exterior surface that includes at least one introduction opening (8) adapted so that can be closed and opened up for the supply of said capsule (7), and in connection with said brewing device (2).

Moreover, said apparatus (5) can include a fluid reservoir (not represented), as well as a fluid pressurization device (9) and a fluid heating device (not represented), so that can supply a flow (FS) at a temperature comprised between 60 and 100° C. and at a pressure comprised between 1 and 20 bar, so as to interact with said edible substance. The expert in the art knows these means so that it is abdicated from a more detailed representation or description thereof.

After brewing the beverage, the beverage discharge flow (BD) is conducted to an exit of said brewing device (2) to a beverage discharge disposition (3) disposed downstream thereof so that the beverage discharge into said beverage recipient (4) flows through said base zone (41) thereof.

According to a first inventive aspect, said introduction opening (8) is provided next to the beverage discharge disposition (3) so that both are accessible on a common exterior surface of the apparatus casing (6) of said beverage preparation apparatus (5), whereby said common exterior surface preferentially corresponds to a single exterior surface on a common plane provided by the top part or by the front part of the apparatus casing (6) of said beverage preparation apparatus (5). In particular, according to the represented preferred embodiment, said beverage discharge disposition (3) is disposed on the top surface and in front of an introduction opening (8) adapted for introduction of a portion (7) of edible substance, on a same exterior surface of the apparatus casing (6) of said beverage preparation apparatus (5). It is herewith advantageously provided a more ergonomic and particularly compact configuration of said beverage preparation apparatus (5).

In the case of the represented preferred embodiment, said beverage discharge disposition (3) is advantageously provided on a more elevated plane relative to said brewing device (2), so that any remaining beverage discharge (BD) falls under the action of the gravity force back to the interior of the beverage discharge disposition (3), preferentially to a lowered collection part (32) that surrounds a respective discharge element (31), as shall be presented further below.

Moreover, in the case of the represented embodiment, the beverage discharge disposition (3) advantageously presents a plurality of discharge elements (31), so that beverage can be supplied simultaneously to two beverage recipients (4).

According to a preferred embodiment, said introduction opening (8) and beverage discharge disposition (3) are provided so that said common exterior surface develops in a single plane and extends beyond, preferentially has at least twice the dimension of the area delimited by said beverage discharge disposition (3) and introduction opening (8), so that advantageously provides an optional support surface for recipients.

It is further preferred when a utilization interface of said apparatus (5), not represented so as to simplify the comprehension of the drawing, is also provided on the same exterior surface, so that all manual utilization actions of said apparatus develop at a same level.

Figure 2:
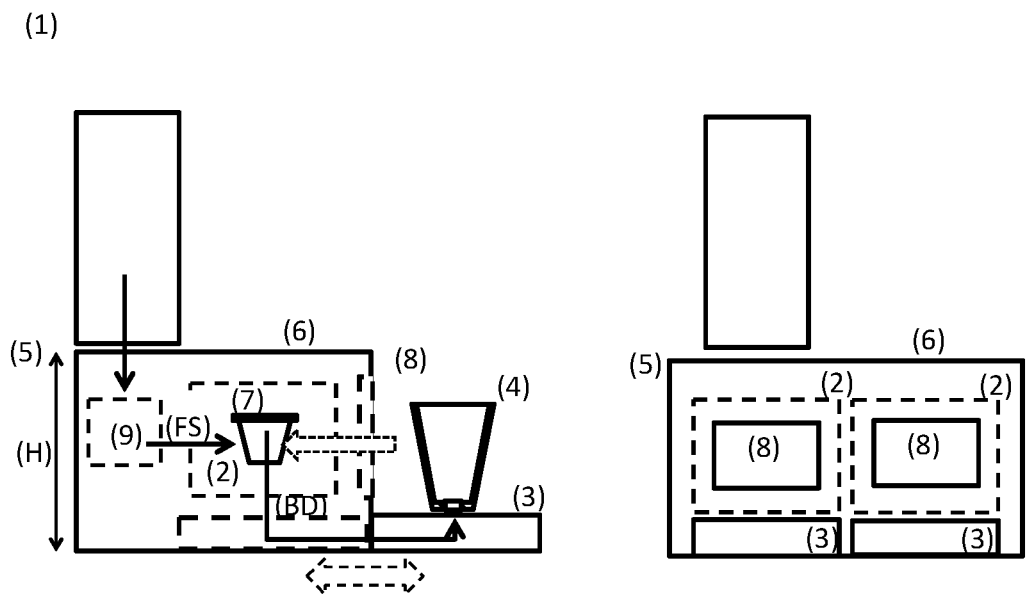
FIG. 2: side (on the left-side) and front views of a second embodiment of an apparatus (5) for preparing beverages comprised on a system (1) according to the present invention.

In the case of the embodiment represented in FIG. 2 of a particularly compact apparatus (5), the introduction of portions (7) of edible substance is done along a horizontal direction, through an introduction opening (8) provided on the front zone of the apparatus casing (6) of said apparatus (5), whereby a respective beverage discharge disposition (3) is provided on a lower plane relative to the brewing device (2).

According to another preferred embodiment, the introduction opening (8) and the beverage discharge disposition (3) are provided mobile, so that can be moved outside and inside, between a respective open and closed position, and vice-versa, relative to said exterior surface of the apparatus casing (6), so that when on a respective closed position, the introduction opening (8) and the beverage discharge disposition (3) develop on a single common plane of exterior surface of the beverage preparation apparatus (5).

According to another preferred embodiment, said apparatus (5) presents a height (H) of at most 10 cm, preferentially at most 8 cm, particularly preferred at most 6 cm. In particular, in the case represented, the apparatus (5) can advantageously present means for connection to external fluid reservoirs (not represented), such as for example standard-like bottles of water, so as to ensure a reduced construction height of said apparatus (5).

Figure 3:
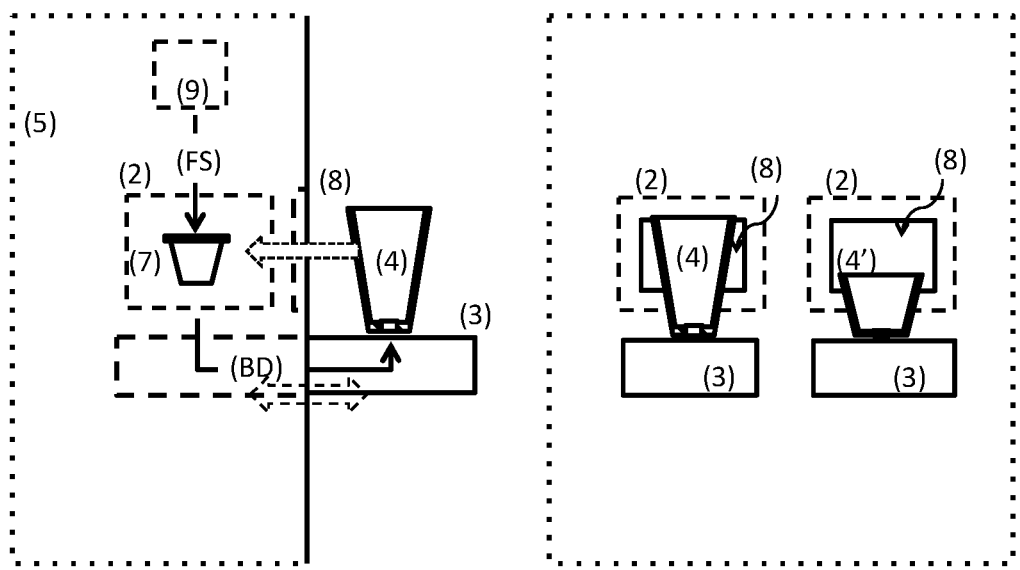
FIG. 3: side (on the left-side) and front views of an embodiment of an apparatus (5) for preparing beverages comprised on a system (1) according to the present invention.

FIG. 3 shows another type of apparatus (5)—identified in merely indicative manner by the dotted line in the drawing—that includes a system (1) for preparing beverages according to the invention, whereby said apparatus (5) can be, for example, a household appliance that provides other functions additionally to the preparation of beverages, such as for example as part of a refrigerator, and integration in other apparatuses, such as for example as part of a vehicle, or as part of a piece of furniture, or similar.

As one can observe, said apparatus (5) includes a brewing device (2) inside, as well as a respective introduction opening (8) that enables the introduction of said portion (7) of edible substance, and at least one beverage discharge disposition (3).

The system (1) for preparing beverages according to the invention can further include a plurality of types of beverage recipients (4, 4') presenting different dimension, in particular different dimensions of respective base zones (41), but adapted so as to engage on the same type of beverage discharge disposition (3), in particular presenting similar engaging means with a respective flux regulation disposition (42).

Figure 4:
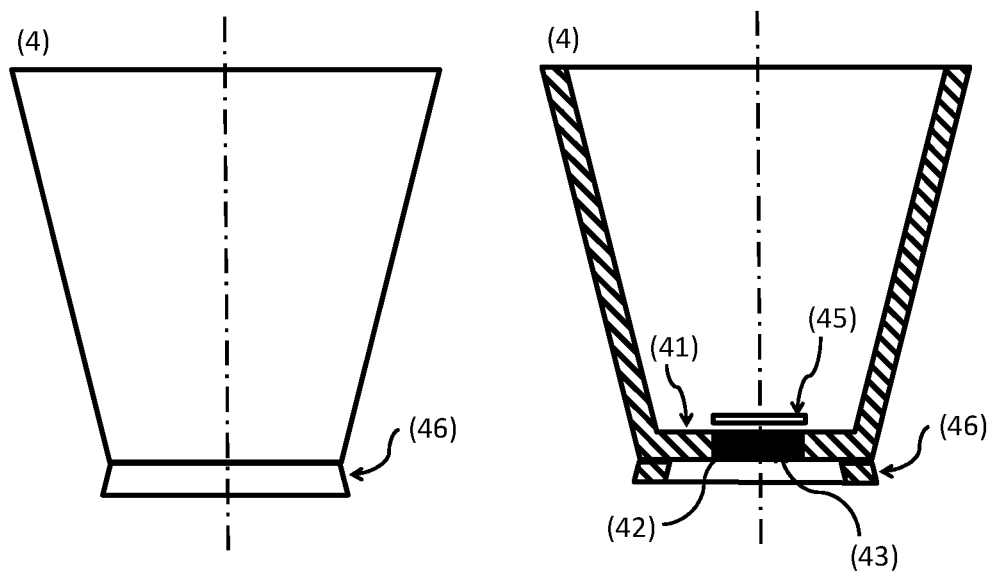
FIG. 4: side view (on the left-side) and respective cut of a first preferred embodiment of a beverage recipient (4) included in a system (1) for preparing aromatic beverages according to the present invention.

FIG. 4 represents in side (on the left-side) and cut views of a first embodiment of a beverage recipient (4), of the type cup, glass or similar, of a system (1) for preparing beverages according to the invention.

As one can observe, said beverage recipient (4) comprises a base zone (41) including a flux regulation disposition (42) that, in this case, is provided as a plurality of flow passageways (43), provided as micro-holes with a dimension adapted so that the fluid flow only passes through them when under a flow pressure bigger than a previously determined value. In particular, said flow passageways (43) present a characteristic cross dimension, for example a diameter, smaller than 0.5 mm, preferentially smaller than 0.2 mm, so that a liquid only passes through them when injected with a flow pressure bigger than a previously defined flow pressure. Moreover, said flow passageways (43) are provided substantially adjacent to each other, in a mesh-like, honeycomb-like disposition, or similar.

According to an inventive aspect, the beverage recipient (4) further presents a flow deflecting element (45) provided in the proximity downstream from said flux regulation disposition (42) and adapted so that deflects the direction of the beverage discharge flow (BD) and substantially occults the holes associated with said flow passageways (43). It is this ways advantageously provided a discharge of aromatic beverage, such as for example of espresso type coffee, that is more favourable in terms of formation and retention of crème and in terms of less exposition to ambient temperature, thus contributing to enhanced quality in the cup. In fact, the discharge to the interior of a beverage recipient (4) through a respective base zone (41) provides a better distribution of beverage inside thereof, also thereby avoiding the risk of any hot fluid spill outs.

Figure 5:
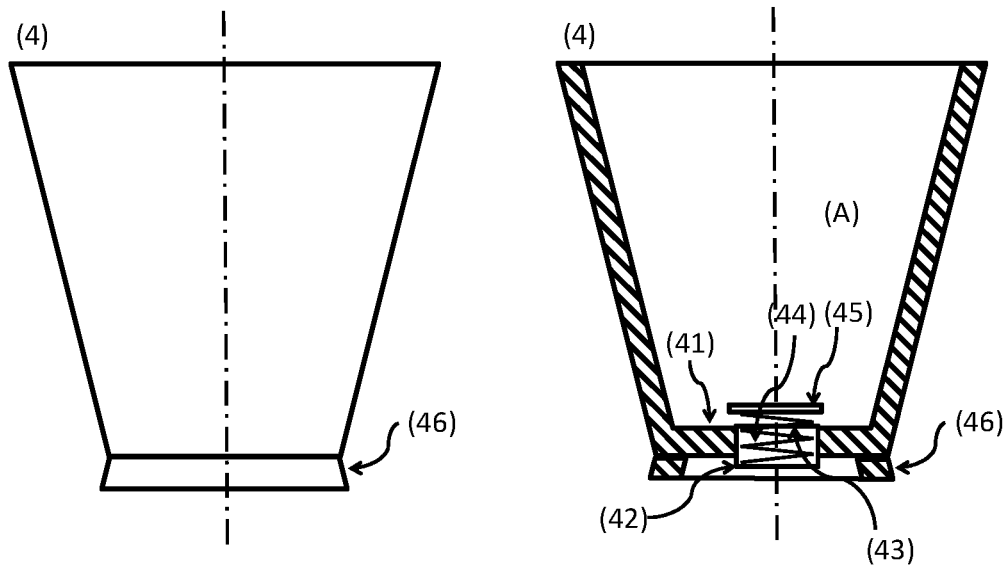
FIG. 5: side view (on the left-side) and respective cut of a second preferred embodiment of a beverage recipient (4) included in a system (1) for preparing aromatic beverages according to the present invention.

In the case of the embodiment of beverage recipient (4) represented on FIG. 5, said flux regulation disposition (42) is provided by a valve-like one-way device, in particular by valve regulated by the upstream flow pressure, such as for example of the type spring vale presenting a spring-like elastic element (44), and provided so that only allows flow passage when the upstream flow pressure is bigger than 1 bar, preferentially bigger than 1.2 bar.

According to said inventive aspect, the flux regulation disposition (42) presents a disc-like flow deflecting element (45) connected to said elastic element and adapted so that provides at least one flow passageway (46) when impinged upwards under the action of said elastic element (44), whereby said flow deflecting element (45) is provided so that occults said flux regulation disposition (42) and preferentially presents a similar appearance to the remaining interior surface of the beverage recipient (4).

It is this way provided a simple and economic solution for adapting different types of beverage recipients (4) with the possibility of beverage discharge through a respective base zone (41) in a direction opposite the gravity force.

Figure 6:
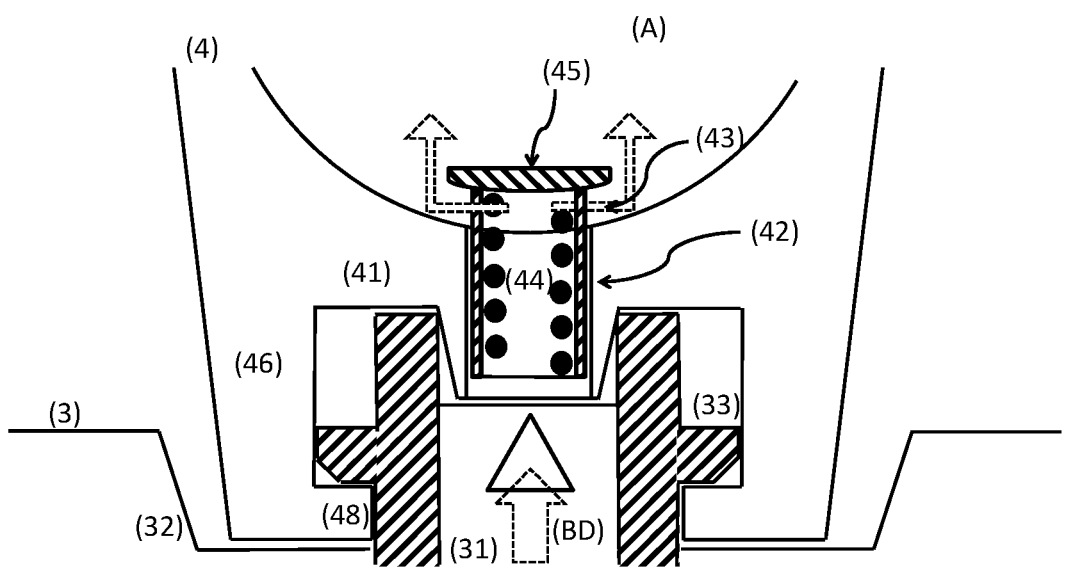
FIG. 6: detail side cut view of a first preferred embodiment of a beverage discharge disposition (3) and beverage recipient (4) in a system (1) for preparing aromatic beverages according to the present invention.

As represented in FIG. 6, said flux regulation disposition (42) can be of the type one-way valve, in particular a valve regulated by upstream flow pressure, such as for example of the type spring vale presenting a spring-like elastic element (44), and provided so that only enables flow passage when the upstream flow pressure is bigger than 1 bar, preferentially bigger than 1.2 bar.

Said flux regulation disposition (42) in this case presents a disc-like flow deflecting element (45) connected to said elastic element and adapted so that presents at least one flow passageway (46) that results unobstructed when said flow deflecting element (45) is impinged upwards under the action of said elastic element (44). As an expert in the field shall readily understand, said flow deflecting element (45) is provided so that can be moved by the action of said elastic element (44) along a previously defined extension in the interior of an opening of the base zone (41), but recovering an initial position of retention in said opening as soon as stops the hydraulic pressure of the beverage discharge flow (BD). According to another preferred embodiment, said flow deflecting element (45) is provided so that substantially occults said flux regulating disposition (42) and that presents a similar appearance to the remaining interior surface of the beverage recipient (4).

As one can further observe in FIG. 6, said discharge device (31) presents a cross-section with a plurality of engagement elements (33) in this case provided as projections configured so that can engage by means of a fitting-like connection under pressure into corresponding fitting elements (47) provided on a cavity part of said base zone (41) of beverage recipient (4).

According to another preferred embodiment, said discharge disposition (3) presents a beverage discharge element (31) that includes at least one flow exit generally oriented upwards, a collection part (32) adapted for collecting the base of beverage recipient (4), and a sealing element (not represented) of type o-ring, or similar, whereby said beverage discharge element (31) is connected with said brewing device (2) by means of a tube, preferentially of flexible type.

Figure 7:
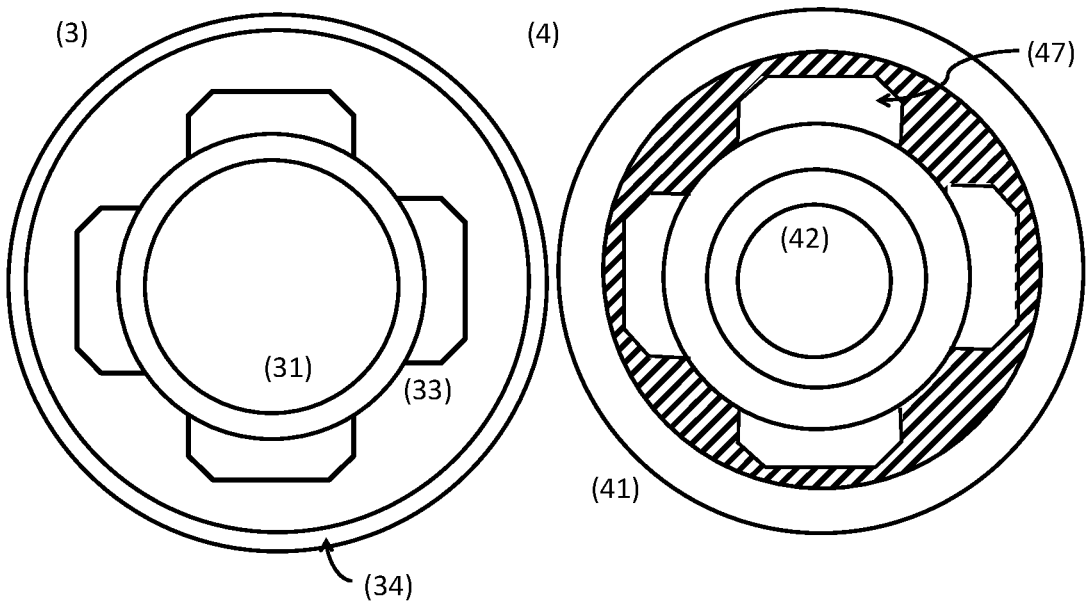
FIG. 7: Top views of connection parts of the beverage discharge disposition (3) (on the left-side) and beverage recipient (4) in a system (1) for preparing aromatic beverages according to the present invention.
Figure 8:
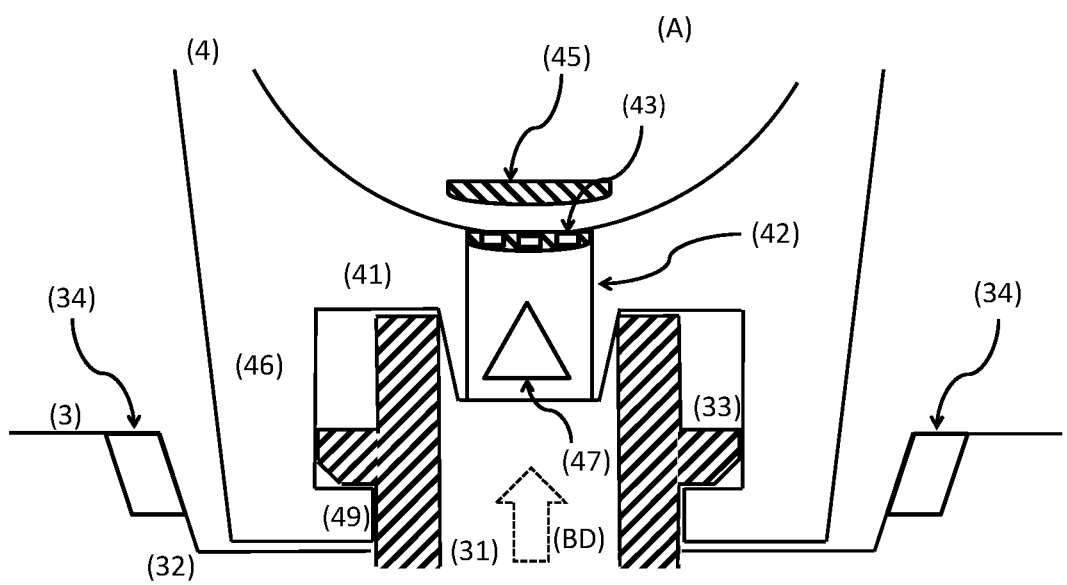
FIG. 8: detail side cut view of a second preferred embodiment of a beverage discharge disposition (3) and beverage recipient (4) in a system (1) for preparing aromatic beverages according to the present invention.

FIG. 7 represents a second embodiment whereby said flux regulating disposition (42) is of the one-way valve type, in particular a valve regulated by the upstream flow pressure, such as for example of the type spring valve.

Said flux regulation disposition (42) in this case presents at least one, preferentially a plurality of flow passageways (43) oriented upwards on a fixed wall, and an elastic element (44) that is supported on said fixed wall and on an admission part (47) that obstructs the flow passageway when said elastic element (44) is not impinged. When impinged by the beverage discharge flow (BD), said elastic element (44) is displaced upwards, thereby moving said admission part (47) and that way providing (situation represented in the drawing) at least one flow passageway through said flux regulation disposition (42) and to the interior of the collection space (A) of beverage recipient (4).

The beverage recipient (4) further presents a flow deflection element (45) provided fixed, next to and downstream of the flux regulation disposition (42). Alternatively, the flux regulation disposition (42) and the flow deflection element (45) are provided as a single piece whereby an interior and vertically oriented flow passageway leads the flow into a plurality of flow passageways (43) oriented horizontally along the exterior perimeter (embodiment not represented).

It is preferred when said flow deflecting element (45) is an integral part of said beverage recipient (4).

According to another preferred embodiment, said apparatus (5) further comprises state display means (34) adapted so as to communicate to a user the correct placement of the beverage recipient (4) on the beverage discharge disposition (3), whereby said state display means (34) are of at least one type, including of visual and acoustic type, and preferentially provided associated with said beverage discharge disposition (3). Moreover, it is preferred when said state display means (34) are provided so that extend at least in part on said common exterior surface, so that result best visible to the user.

Figure 9:
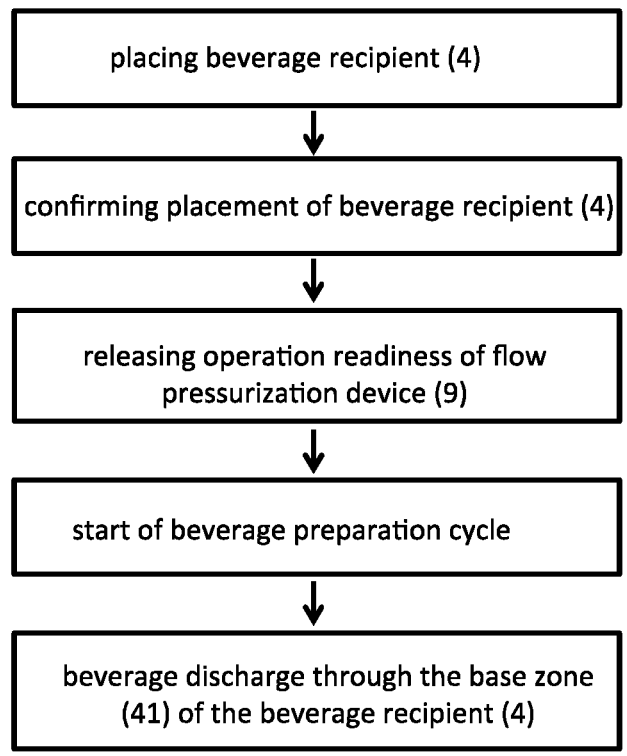
FIG. 9: diagram of a preferred embodiment of a process for preparing beverages according to the invention.
Figure 10:
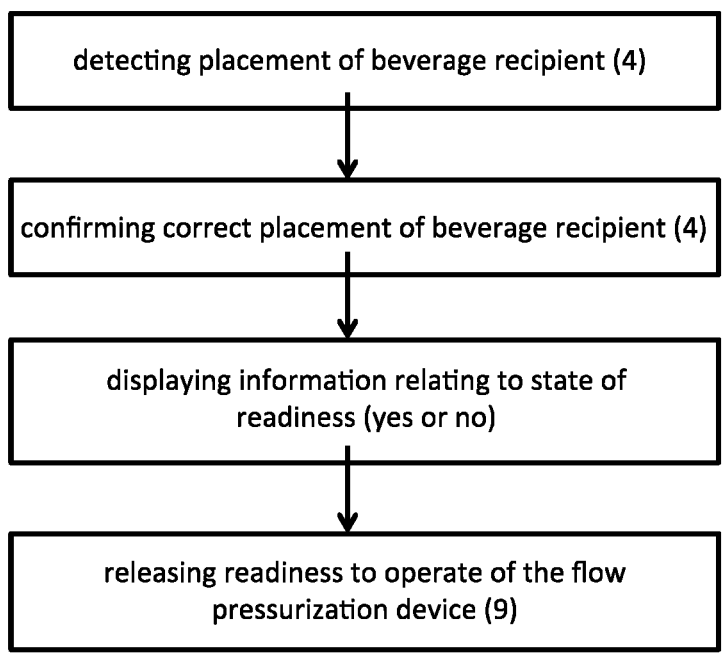
FIG. 10: diagram of a second preferred embodiment of a process for preparing beverages according to the invention.

FIGS. 9 and 10 represent preferred embodiments of a process for preparing beverage according to the present invention.

According to a first aspect, and as one can observe on FIG. 9, the start of each beverage preparation cycle is preceded by the confirmation of placement of a beverage recipient (4) engaged on a beverage discharge disposition (3). In the affirmative case, a control device of the apparatus (5), releases the readiness to operate of the flow pressurization device (9) so that the cycle of beverage preparation can start, including the discharge of beverage by means of said beverage discharge disposition (3) and through the base zone (41) of said beverage recipient (4). It is herewith ensured that the beverage recipient (4) can effectively collect the beverage discharge in safety conditions.

Moreover, as represented on FIG. 10, the process further includes the steps of detecting the operational state corresponding to at least one of: readiness of the flow pressurization device (9), and correct placement of said beverage recipient (4) on said beverage discharge disposition (3), as well as the steps of displaying information on the operational state relating to at least one of placement and correct placement of said beverage recipient (4) on said beverage discharge disposition (3), preferentially by state display means (34) provided on said beverage discharge disposition (3), whereby the flow pressurization device (34), for example a pump, is prevented from operating while there is detected at least one of non placement and incorrect placement of said beverage recipient (4) on said beverage discharge disposition (3).

The invention claimed is:

1. A system (1) for preparing beverages from an edible substance, comprising:
at least one beverage recipient (4, 4') providing a beverage collection space (A) between a top and a bottom thereof and having in the bottom a base zone (41) with a flux regulation disposition (42) for permitting a fluid flow upwards into the collection space; and
at least one beverage preparation apparatus (5) comprising, from upstream to downstream along the flow direction:
a fluid flow pressurization device (9), operative to supply a fluid flow (FS) at a pressure comprised between 1 and 20 bar,
a brewing device (2) adapted to receive a fluid and a capsule (7) of edible substance in a brewing position, and supply a resulting beverage discharge flow (BD) by passing the fluid though said capsule when in said brewing position,
a beverage discharge disposition (3) that provides a support for receiving at least one beverage recipient (4, 4') on a top surface thereon, and provides said discharge flow (BD) into the collection space (A),
wherein said beverage preparation apparatus (5) presents an exterior surface that includes on a front part thereof a closable introduction opening (8) adapted to pass said capsule to said brewing position in said brewing device (2),
wherein said introduction opening (8) and said beverage discharge disposition (3) are provided on a same vertical exterior surface of said beverage preparation apparatus (5), on a common plane provided by the front part of said beverage preparation apparatus (5), and
wherein said beverage discharge disposition (3) is horizontally movable with said beverage recipient thereon through said introduction opening (8), between a position external to said beverage preparation apparatus and a position internal to said beverage preparation apparatus for receiving said beverage discharge flow (BD).

2. The system (1) according to claim 1 wherein said introduction opening (8) is provided at a height above said discharge disposition (3) with relation to the top part of the beverage preparation apparatus (5), on said vertical exterior surface.

3. The system (1) according to claim 2, wherein said beverage discharge disposition (3) is movable outwards and inwards relative to said common exterior surface, between a respective closed and open position, and vice-versa.

4. The system (1) according to claim 1, wherein said introduction opening (8) and beverage discharge disposition (3) are provided so that said vertical exterior surface develops along a single plane and extends beyond at least twice the dimension of the area delimited by said introduction opening (8) and beverage discharge disposition (3).

5. The system (1) according to claim 1, wherein said apparatus (5) further comprises a utilization interface comprising means for actuating upon a beverage preparation cycle and provided on the same exterior surface as the introduction opening (8) and the beverage discharge disposition (3), so that the manual operations of utilization of said apparatus (5) can unfold on a similar plane.

6. The system (1) according to claim 1, wherein said beverage preparation apparatus (5) further comprises means for detecting the placement of a beverage recipient (4) on said beverage discharge disposition (3), and recognize a correct placement and engagement, of the beverage recipient (4) on said beverage discharge disposition (3).

7. The system (1) according to claim 1,
wherein said beverage discharge disposition (3) comprises state display means (34) adapted to communicate to the user at least one of a state of correct placement of a beverage recipient (4) on said top surface of said beverage discharge disposition (3), a state of operation readiness, a state of operation on-going, and a state of operation concluded,
whereby said state display means (34) are of at least one type including of visual type and of acoustic type.

8. The system (1) according to claim 1, wherein said beverage discharge disposition (3) comprises state display means (34) provided to extend at least in part on said common exterior surface, along of at least part of the total perimeter of an edge associated with said beverage discharge (3), so as to ensure the visibility of said state display means (34) to a user of said beverage preparation apparatus (5).

9. The system (1) according to claim 1, wherein said beverage discharge disposition (3) presents a beverage discharge device (31) that includes at least one generally upwards oriented flow exit, and a sealing element, whereby said beverage discharge device (31) is connected with said brewing device (2) by means of a tube.

10. The system (1) according to claim 1, wherein said beverage discharge disposition (3) comprises a beverage discharge device (31) that presents a plurality of engagement elements (33) configured as cavities or projections that can engage by means of a hook-like connection in corresponding fitting elements (47) provided on a cavity part of said base zone (41) of said beverage recipient (4, 4').

11. The system (1) according to claim 1, wherein said beverage discharge disposition (3) presents a collection part (32) provided as a cavity presenting at least one surface lowered relative to a remaining top surface of the beverage discharge disposition, preferentially in inclined manner towards a centre or a perimeter region, and presenting at least one passageway for fluid collection towards a lower level.

12. A process for preparing a beverage including the steps:
providing a beverage preparation apparatus (5) presenting a flow pressurization device (9) for a fluid, at least one brewing device (2) adapted to receive the fluid and a capsule (7) of edible substance inside thereof, and at least one horizontally moveable beverage discharge disposition (3) adapted to move between an outside loading position and an inside brewing position and, at said inside brewing position, receive a discharge beverage flow (BD) into a beverage recipient (4) placed said discharge disposition, whereby each beverage preparation cycle includes the steps:
detecting operational states corresponding to at least one of readiness of the flow pressurization device (9), placement of said beverage recipient (4) on said beverage discharge disposition (3), and correct placement of said beverage recipient (4) on said beverage discharge disposition (3);
horizontally moving said movable beverage discharge disposition with said beverage recipient correctly placed thereon from a position external to said beverage preparation apparatus to a position internal to said beverage preparation apparatus and receive said beverage discharge;
providing said liquid under pressure to said capsule and create said beverage discharge into said beverage recipient on said beverage discharge disposition,
after receiving said beverage discharge, horizontally moving said movable beverage discharge disposition with said beverage recipient from said position internal to said beverage preparation apparatus to a position external to said beverage preparation apparatus; and
displaying operational state information relating to at least one of readiness of the flow pressurization device, placement of said beverage recipient (4) on said beverage discharge disposition (3), and correct placement of said beverage recipient (4) on said beverage discharge disposition (3) by state display means (34) provided on said beverage discharge disposition (3);
wherein the flow pressurization device (34) is prevented from operating as long as there is detected at least one of non placement and incorrect placement of said beverage recipient (4) on said beverage discharge disposition (3).

13. The process according to claim 12, further comprising the following steps:
placing a beverage recipient (4) having a base zone (41) on said beverage discharge disposition (3);
supplying the capsule (7) of beverage precursor substance to a brewing device (2) through an introduction opening (8);
actuating start of supply by flow pressurization device (9) of a pressurized fluid flow to said brewing device (2), so that a beverage discharge flow is formed with a pressure higher than the atmospheric pressure out of said brewing device (2);
conducting said beverage discharge flow (BD) to a beverage discharge disposition (3) comprising a discharge element (31) provided so that the beverage discharge flow (BD) flows along a direction that is generally opposite the gravity force direction, and
discharging the beverage upwards through said discharge element (31), with a previously defined pressure into the interior of the beverage recipient (4) through the base zone (41) thereof.

14. The process according to claim 13, wherein the step of placing a beverage recipient (4) on said beverage discharge disposition (3) includes an engaging retention of a fitting part (45) that is provided on said base zone (41), with a discharge element (31) of said beverage discharge disposition (3).

15. The process according to claim 13, wherein the step of placing a beverage recipient (4) on said beverage discharge disposition (3) includes the actuation of a sensor of recipient placement adapted to recognize the presence and correct retention of a beverage recipient (4) on said beverage discharge disposition (3),
   whereby said sensor of recipient placement is associated to a respective discharge element (31) and provided in functional connection with a control device of said apparatus (5), so that the start of each beverage preparation cycle only takes place after reception of a signal of correct placement and retention of said beverage recipient.

\* \* \* \* \*